March 3, 1970 — P. C. KESLING — 3,497,954
BYPASS CLAMP FOR ORTHODONTIC BRACKET
Filed July 3, 1968 — 2 Sheets-Sheet 1
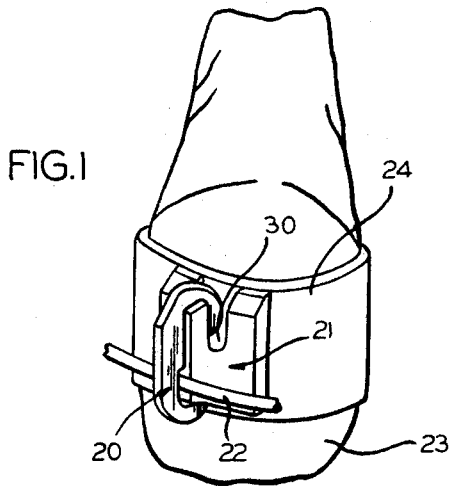
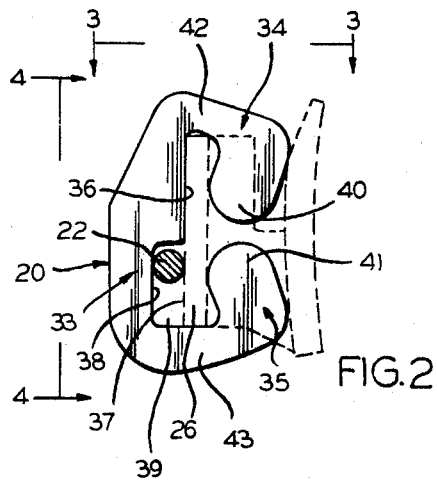
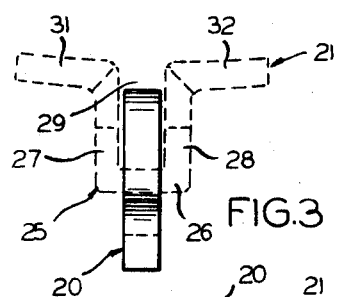
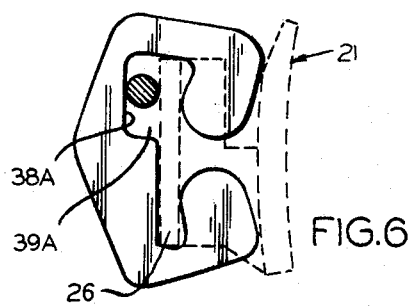
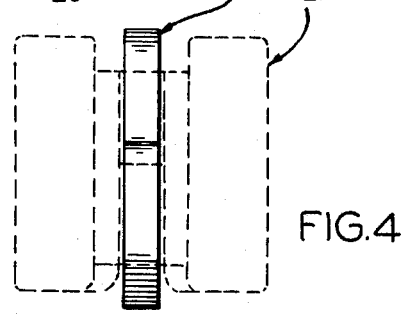
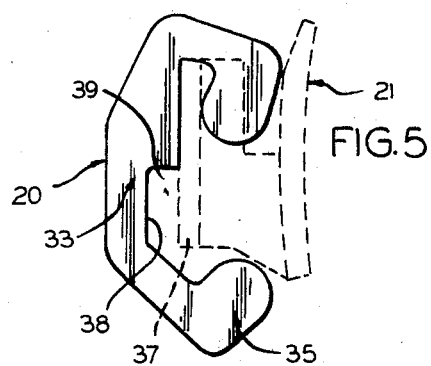
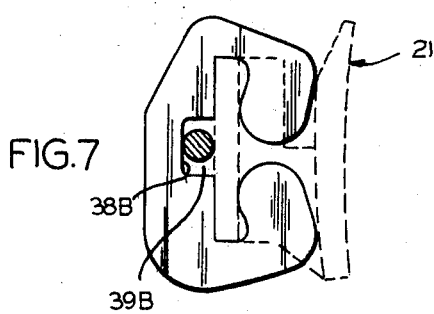
INVENTOR
PETER C. KESLING
BY
ATTORNEYS March 3, 1970   P. C. KESLING   3,497,954
BYPASS CLAMP FOR ORTHODONTIC BRACKET
Filed July 3, 1968   2 Sheets-Sheet 2
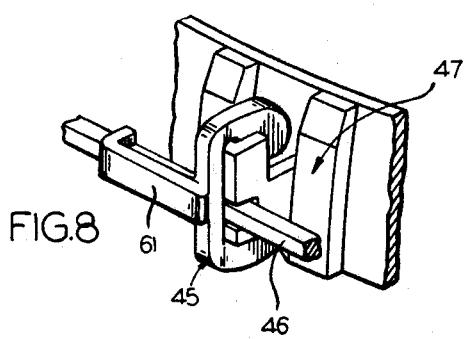
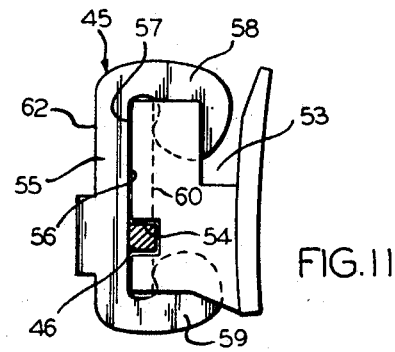
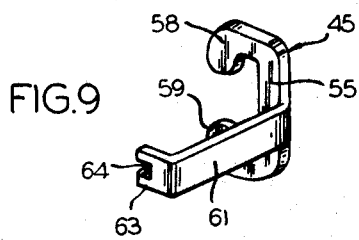
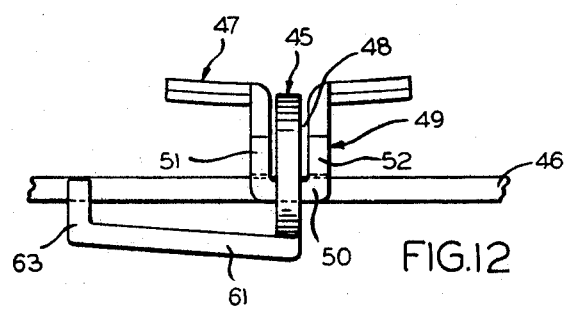
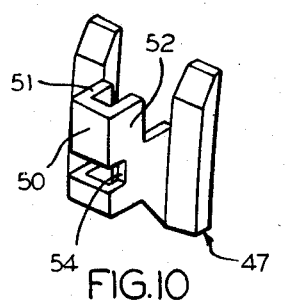
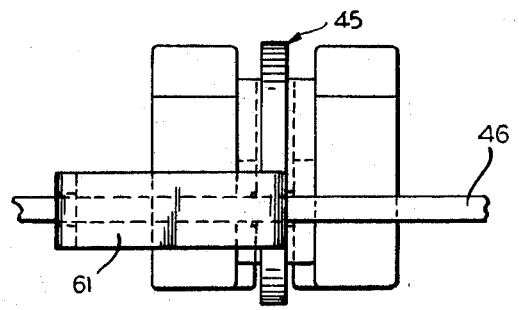
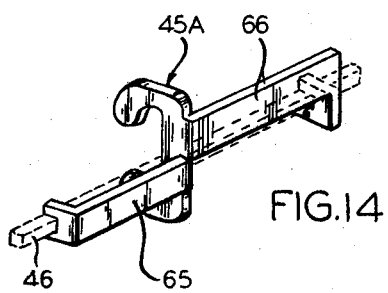
INVENTOR
PETER C. KESLING
BY
ATTORNEYS

United States Patent Office 3,497,954
Patented Mar. 3, 1970

3,497,954
BYPASS CLAMP FOR ORTHODONTIC BRACKET
Peter C. Kesling, Green Acres, La Porte, Ind. 46350
Filed July 3, 1968, Ser. No. 742,316
Int. Cl. A61c 7/00
U.S. Cl. 32—14    12 Claims

ABSTRACT OF THE DISCLOSURE

Bypass clamp mountable on the labial side of an orthodontic bracket to restrain an arch wire while permitting relative tipping between the bracket and wire. The clamp is formed to prevent any appreciable relative rotation between the bracket and clamp. A notch is formed along the lingual side of the clamp to coact with the bracket and define an arch wire receiving opening having an occlusal-gingival dimension substantially greater than that of the wire. The clamp may also include an arm extending mesially or distally and engaging the arch wire to apply a rotational stabilizing or movement force to the tooth.

---

This invention relates in general to orthodontic appliances, and more particularly to a bypass clamp for use with an orthodontic bracket to enable the restraining of an arch wire at the labial side of the bracket.

During orthodontic treatment appliances are mounted on the teeth of a patient, and thereafter interconnected by an arch wire. The appliances include brackets having an arch wire notch and an occlusal-gingivally extending opening associated with the arch wire notch or slot to receive a lockpin that would normally secure the arch wire to the bracket. In some instances, a tooth upon which a bracket is mounted may need to be moved into position, and, therefore, is initially so out of position that the bracket, when applied thereto, is not oriented to permit the locking of the arch wire directly thereto in the arch wire slot. Heretofore, when a wire could not readily be positioned in the arch wire slot, several different methods and devices have been employed for restraining the wire at the labial side of the bracket. These devices have been objectionable. For example, one method employed has involved the spot welding of a U-shaped piece onto the labial side of a bracket for restraining the arch wire. In this situation, following the desired moving of the tooth into a selected position, it is necessary to grind off the U-shaped piece when applying the arch wire directly to the arch wire slot of the bracket. A C-shaped clamp has also been employed, which has a circular cross section and is in the form of a wire clamp. These clamps have been applied to the labial side by having the opposite ends inserted into the opposite ends of the occlusal-gingivally extending opening of the bracket. However, these clamps have not been satisfactory inasmuch as they often rotate around the bracket body, thereby allowing one end to fall into the arch wire slot and ultimately to be loosened and lost from the bracket, thereby eliminating any restraining action of the arch wire to that bracket. Moreover, these C-shaped clamps have not been strong enough to maintain a proper position on the bracket.

The present invention comprises a clamp that may be easily applied or removed from a bracket by a pliers or the like, for the purpose of restraining a wire at the labial side of the bracket, and which is constructed so that it is strong enough to maintain a proper position on the bracket, and will not be permitted to rotate relative to the bracket. The clamp includes a body made of flat stock having an intermediate portion positioned at the labial side of the bracket and opposite end portions insertable into the occlusal-gingivally extending opening to securely fasten the clamp into the position on a bracket. The lingual side of the intermediate portion is formed to define with the labial side of the bracket body an arch wire receiving slot. At least one of the end portions of the clamp is provided with a cross sectional configuration that coacts with the occlusal-gingivally extending opening to preclude substantial relative rotation between the clamp and the bracket, and thereby prevent the clamp from rotating to a position in alignment with the arch wire slot of the bracket.

A modification of the clamp involves its application to a bracket having a mesial-distal slot at the labial side for receiving an arch wire of rectangular cross section. The clamp of the invention for this modification includes an intermediate portion formed to lock the arch wire in the slot of the bracket and to also engage the arch wire at another point therealong spaced from the bracket.

Accordingly, it is an object of the present invention to provide a bypass clamp for use with orthodontic brackets to enable the restraining of an arch wire at the labial side of a bracket, wherein the clamp will always maintain its proper position on the bracket, and be capable of being easily applied or removed by the use of pliers or other suitable tools.

Another object of this invention is in the provision of a bypass clamp for an orthodontic bracket which is precluded from substantial relative rotation with the bracket by its coaction with the bracket opening.

Another object of this invention resides in the provision of a bypass clamp for an orthodontic bracket that is capable of two or three-point contact with the arch wire.

Other objects, features and advantages of the invention will be apparent from the following detailed disclosure, taken in conjunction with the accompanying sheets of drawings, wherein like reference numerals refer to like parts, in which:

FIG. 1 is a perspective view of a tooth having a bracket mounted thereon with the bypass clamp of the present invention in place on the bracket and restraining an arch wire.

FIG. 2 is a side elevational view of the bypass clamp of the present invention shown in association with a bracket in dotted lines and an arch wire in section, as it appears when properly applied to a bracket.

FIG. 3 is a top plan view of the clamp shown in FIG. 2 and taken substantially along line 3—3 thereof, and also illustrating the bracket in dotted lines.

FIG. 4 is a front elevational view of the clamp of FIG. 2 taken substantially along line 4—4 thereof and illustrating the bracket in dotted lines.

FIG. 5 is a view of the clamp prior to application to a bracket, wherein one of the end portions is in open position to allow mounting of the clamp onto the bracket.

FIG. 6 is a view similar to FIG. 2, but illusrating the clamp in an inverted position so that the slot is at a different location than that shown in FIG. 2.

FIG. 7 is a view of a modification, wherein it differs from the embodiments of FIGS. 2 and 6 in that the arch wire slot is arranged centrally of the intermediate portion.

FIG. 8 is a perspective view of a further modification of the invention, wherein the bracket is provided with a slot on the labial side for receiving a rectangular arch wire, and whereby the clamp includes an extension to define two-point contact with the arch wire.

FIG. 9 is a perspective view of the clamp of FIG. 8 looking at it from the extension end.

FIG. 10 is a perspective view of the bracket shown in FIG. 8 with the other parts removed.

FIG 11 is a side elevational view of the clamp of FIG. 8 illustrating its coaction with the bracket and arch wire.

FIG. 12 is a top elevational view of the clamp of FIG. 8 and showing it in association with the bracket and arch wire.

FIG. 13 is a front elevational view of the bracket of FIG. 8 and illustrating it in association with the bracket and arch wire; and FIG. 14 is a perspective view of a clamp similar to that shown in FIG. 8, but modified to provide three-point contact with the arch wire.

Referring now to the drawings and particularly to FIG. 1, the bypass clamp of the present invention, generally designated by the numeral 20, is shown in operating position on a bracket 21 to restrain an arch wire 22 at the labial side of the bracket. The bracket 21 is mounted on a tooth 23 by securing the bracket in any suitable fashion to a tooth band 24, that may be in turn cemented to the tooth. The manner of mounting the bracket on the tooth forms no part of the present invention. The bracket may be made of a suitable metal, plastic, or any other sufficiently rigid material.

The bypass clamp 20 is adapted to be employed with any bracket having an arch wire slot and a lockpin opening, the latter being arranged to coact with a lockpin for attaching an arch wire to the bracket and ultimately to the tooth. A bracket 21 is of the type commonly used in light wire treatment, and includes a body 25 having occlusal-gingival extending labial, mesial and distal walls 26, 27 and 28, respectively, defining with the band or tooth an occlusal-gingivally extending opening 29. Depending upon the placement of the bracket in the mouth, the mesial wall 27 may be considered the distal wall, while the distal wall 28 may be considered the mesial wall. The mesial and distal walls are generally substantially parallel and are opposed, while the labial wall extends substantially normal to the mesial and distal walls. In the normal placement of the bracket within the mouth, the labial wall 26 will extend mesial-distally, while the mesial and distal walls will extend labial-lingually. It is when this orientation is otherwise that difficulty is encountered in attaching the arch wire to the bracket in the normal manner, thereby occasioning the use of the bypass clamp according to the present invention. An arch wire slot or notch 30 is provided at the lingual edges and gingival ends of the mesial and distal walls 27 and 28 for receiving an arch wire in the normal situation, whereby a lockpin would be inserted into the gingival end of the opening 29 to lock the arch wire in the slot. The size of the slot 30 would normally coact with the diameter of the arch wire and be sized accordingly.

Attaching flanges at 31 and 32 extend from the lingual ends of the mesial and distal walls 27 and 28 for facilitating attachment of the bracket to the band or tooth. When attaching the bracket to a band, such may be accomplished by spot welding, soldering, or otherwise attaching the brackets to the band.

The bypass clamp 20 is preferably made from flat stock of any suitable material and includes an intermediate portion 33, a gingival end portion 34 and an occlusal end portion 35. The end portions are integral respectively with the gingival and occlusal ends of the intermediate portion. The lingual side or edge 36 of the intermediate portion is formed to coact with the labial face 37 of the bracket labial wall 26 to define an arch wire receiving opening. In the embodiment of FIGS. 2 to 5, the lingual edge 36 of the intermediate portion 33 includes a straight portion that extends for more than half of the gingival-occlusal dimension of the bracket labial wall 26, and a slot, notch or recess 38 that coacts with the labial face 37 to define an arch wire opening 39, which will receive the arch wire 22.

The embodiment of FIGS. 2 to 5 illustrate the opening as being at the occlusal end of the labial wall 26, although the slot 38 may be positioned anywhere along the lingual edge 36 of the intermediate portion 33. For example, the embodiment of FIG. 6 shows the slot designated by the numeral 38A at the gingival end of the bracket and clamp to define the arch wire opening 39A at the gingival end of the bracket, while the embodiment of FIG. 7 shows a slot 38B defining an arch wire opening 39B positioned substantially centrally along the labial side of the bracket. The embodiment of FIG. 6 is obtained by inverting the clamp before applying. Moreover, the labial-lingual depth of the state 38 maybe sized in any desired manned such as shown to define an arch wire opening having a labial-lingual depth about equal to the diameter of the arch wire. It is generally preferable to provide the gingival-occlusal width of arch wire slot to be substantially greater than the diameter of the arch wire, so that the gingival-occlusal dimension of the opening will permit some gingival-occlusal movement of the arch wire relative to the bracket.

The gingival and occlusal end portions 34 and 35 respecively include enlarged lugs 40 and 41 interconnected by webs 42 and 43 to the opposite ends of the intermediate portion 33. The cross section of at least one of the lugs is such as to coact with the cross section of the bracket opening to reduce relative rotation between the bypass clamp and the bracket. Actually, in the present embodiment the cross section of both lugs is such as to coact with the cross section of the bracket opening to reduce relative rotation between the clamp and bracket. Accordingly, the mesial-distal width of the lugs is slightly less than the mesial-distal width of the bracket opening, while the labial-lingual dimension of the lugs is such as to be preferably greater than one half of the labial-lingual dimension of the bracket opening. As illustrated, the lugs substantially fill the mesial-distal and labial-lingual dimensions of the bracket opening 29. The lugs, when in operative securing relationship relative to the bracket, may engage the lingual face of the labial wall 26 as illustrated in the drawings, although such is not necessary.

Prior to application of the bypass clamp to a bracket, it is in the form shown in FIG. 5. To apply the clamp to the bracket, the lug 34 is first inserted within one end of the opening, while the other lug 35 is aligned with respect to the other end of the opening. Then pressure is applied to the lugs with any suitable tool, such as a pliers, to bend the lugs toward each other until they attain a position such as shown particularly in FIGS. 2, 6 and 7. The bypass clamp may be easily removed from the bracket by bending outwardly one of the end portions to a position similar to that shown in FIG. 5, and withdrawing the other lug. Thereafter, the arch wire may be suitably secured in the arch wire slot 30 in any suitable manner. Thus, where a tooth is in a position making it impractical to initially connect the arch wire to the bracket by inserting same in the slot 30, the arch wire may be restrained to the bracket by attaching same at the labial side of the bracket with the bypass clamp of the present invention. Once the tooth is moved into a position enabling attachment of the arch wire to the arch wire slot, the clamp may be removed and the arch wire may be reattached to the bracket by the usual method of inserting it in the arch wire slot and locking it thereto with a lockpin. During use of the clamp, proper positioning of the clamp is assured through the coaction of the end portions with respect to the opening 29. Slight rotational movement of the clamp relative the bracket may be present, and such is not objectionable, but the clamp will not be capable of rotating into alignment with the arch wire slot.

The embodiment of FIGS. 8 to 13 differs from the embodiment of FIGS. 1 to 7 in that the bypass clamp of the present invention is employed for use with an arch wire having a rectangular cross section and a bracket having an arch wire receiving slot at the labial side. In this embodiment, the bypass clamp is generally designated by the numeral 45 and employed to secure the rectangular in cross section arch wire 46 to the bracket 47. An occlusal-gingivally extending opening 48 is defined by a bracket body 49 having a labial wall 50, a mesial wall 51 and a distal wall 52. An arch wire slot 53 of the usual type is provided at the gingival-lingual corner of the mesial and distal walls 51 and 52, while the mesial-distally extending arch wire slot 54 is provided in the labial wall 50 opening labilially, and defining with the bypass clamp 45 a rectangular in cross section arch wire receiving opening that restrains the arch wire 46 from relative rotation between it and the bracket.

The clamp 45 includes an intermediate portion 55 having a lingual edge 56 formed to lock the arch wire 46 into the arch wire slot 54. Thus, the lingual edge 56 is straight or flat and bears against the straight or flat labial side 57 of the bracket lingual wall 50. The clamp 45 also includes gingival and occlusal end portions 58 and 59 with the gingival and occlusal ends of the intermediate portion 55 for insertion into the gingival and occlusal ends of the bracket opening 48 to engage against the lingual face 60 of the bracket labial wall 50, and firmly secure the clamp in place on the bracket. As in the first embodiment, the cross sectional configurations of the end portions 58 and 59 are such as to coact with the cross section of the bracket opening 48 and preclude substantial relative between the clamp and bracket. Thus, the arch wire will always be locked into place in the arch wire slot 54. While the slot 54 is shown to be adjacent to the occlusal end of the bracket, it should be appreciated that it could be positioned anywhere along the labial wall 50 to provide the desired positioning of the arch wire 46 relative to the bracket.

The clamp 45 also includes an arm or extension 61 integral with the labial edge 62 of the intermediate portion 55 that may extend either mesially or distally, and which includes at its free end a bifurcated portion 63 that engages the arch wire 46 and provides a two-point contact between the arch wire and the clamp. The bifurcated portion 63 includes a notch 64 shaped to fit over the arch wire 46. The arm 61 is either rigid or of resilient material to define a relationship relative to the main body of the clamp, so as to provide any additional movement with respect to the bracket and wire as desired. While the arm 61 is shown primarily with the clamp 45, it should be appreciated that it could also be employed with respect to the clamp shown in FIGS. 1 to 7.

The clamp 45A shown in FIG. 14 differs from the clamp 45 of FIGS. 8 to 13 only in that a pair of arms or extensions 65 and 66 are shown extending both mesially and distally from the main body of the clamp to engage the arch wire 46 both mesially and distally of the bracket and define a three-point contact between the bracket and clamp. Additional control may be had with this embodiment.

It will be understood that modifications and variations may be effected without departing from the scope of the modern concepts of the present invention.

The invention is hereby claimed as follows:

1. In combination with an orthodontic bracket including a body having connected occlusal-gingivally extending mesial, labial and distal walls defining an occlusal-gingivally extending opening, and a mesial-distally extending arch wire slot formed in said mesial and distal walls, a bypass clamp for restraining an arch wire at the labial side of the labial wall, said clamp comprising an intermediate portion having a lingual face formed to partially engage the labial side of the labial wall in bypass relation to said arch wire slot and to define therewith an arch wire receiving opening having an occlusal-gingival dimension substantially greater than the cross sectional dimension of the arch wire to permit relative tipping between the arch wire and bracket, an occlusal end portion integral with the occlusion end of said intermediate portion and extending into the occlusal end of said occlusal-gingivally extending opening, and a gingival end portion integral with the gingival end of said intermediate portion and extending into the gingival end of said occlusal-gingivally extending opening, one of said end portions having a cross section coacting with the cross section of said bracket opening to prevent such relative rotation between the bracket and clamp that would enable the clamp to align with the arch wire slot.

2. The combination as defined in claim 1, wherein said lingual face of said intermediate portion is formed to position the arch wire receiving opening medially along the labial side of the labial bracket wall.

3. The combination as defined in claim 1, wherein said lingual face of said intermediate portion is formed to position the arch wire receiving opening occlusally along the labial side of the labial bracket wall.

4. The combination as defined in claim 1, wherein said lingual face of said intermediate portion is formed to position the arch wire receiving opening gingivally along the labial side of the labial bracket wall.

5. The combination as defined in claim 1, wherein at least one of said portions is formed to have a labial-lingual thickness sufficient to substantially fill the labial-lingual dimension of the occlusal-gingivally extending opening.

6. The combination as defined in claim 1, wherein said lingual face of said intermediate portion is formed to position the arch wire receiving opening, wherein the other of said end portions is provided with a cross section coacting with the cross section of said bracket opening to additionally prevent such relative rotation between the bracket and clamp.

7. In combination with an orthodontic bracket including a body having connected occlusal-gingivally extending mesial, labial and distal walls defining an occlusal-gingivally extending opening, a bypass clamp for restraining a round arch wire at the labial side of the labial wall, said clamp comprising a body of flat stock attachable to the labial wall of the bracket and having a mesial-distal dimension substantially less than that of the bracket labial wall, said clamp body including an intermediate portion, an occlusal end portion at one end of said intermediate portion, and a gingival end portion at the other end of said intermediate portion, said intermediate portion having a straight lingual face with a slot therealong and engaging the labial side of said labial wall to support the intermediate portion relative said labial wall and to define therewith an arch wire receiving opening at the labial side of the bracket, said slot defining with said bracket labial wall an occlusal gingival dimension substantially greater than the diameter of the arch wire and a labial-lingual dimension slightly greater than the diameter of the arch wire, said occlusal end portion extending into the occlusal end of said bracket opening, said gingival end portion extending into the gingival end of said bracket opening, and said end portions formed to coact with the cross section of the bracket opening to prevent substantial relative rotation between the bracket and clamp.

8. An orthodontic bracket bypass clamp for restraining an arch wire at the labial side of a bracket having an occlusal-gingivally extending opening, said clamp comprising an intermediate portion having a lingual face formed to partially engage the labial side of a bracket and having a notch therealong defining an arch wire receiving opening, said arch wire receiving opening having an occlusal-gingival dimension substantially greater than that of the arch wire and a labial-lingual dimension slightly greater than that of the arch wire, an occlusal end portion integral with the occlusal end of said intermediate portion and extending into the occlusal end of said bracket opening, and a gingival end portion integral with the gingival end of said intermediate portion and extending into the gingival end of said bracket opening, one of said end portions having a rectangular cross section coacting with the cross section of said bracket opening to prevent substantial relative rotation between the bracket and clamp.

9. An orthodontic bracket bypass clamp for restraining an arch wire at the labial side of a bracket having an occlusal-gingivally extending opening, said clamp comprising a body of flat stock attachable to the labial side of the bracket and including an intermediate portion, an occlusal end portion at one end of said intermediate portion and a gingival end portion at the other end of said intermediate portion, said intermediate portion having a straight lingual face with a slot therealong and engaging the labial side of the bracket to support the intermediate portion relative to said bracket and to define therewith an arch wire receiving opening at the labial side of the bracket, said arch wire receiving opening having an occlusal-gingival dimension substantially greater than that of the arch wire and a labial-lingual dimension slightly greater than that of the arch wire, said occlusal end portion extending into the occlusal end of said bracket opening, said gingival end portion extending into the gingival end of said bracket opening, and said end portions formed to coact with the cross section of the bracket opening to prevent substantial relative rotation between the bracket and clamp.

10. In combination with an orthodontic bracket including a body having connected occlusal-gingivally extending mesial, labial and distal walls defining an occlusal-gingivally extending opening, a bypass clamp for restraining an arch wire at the labial side of the labial wall, said clamp comprising an intermediate portion having a lingual face formed to partially engage the labial side of the labial wall and to define therewith an arch wire receiving opening, said arch wire receiving opening having an occlusal-gingival dimension substantially greater than that of the arch wire and a labial-lingual dimension slightly greater than that of the arch wire, an occlusal end portion integral with the occlusal end of said intermediate portion and extending onto the occlusal end of said occlusal-gingivally extending opening, and a gingival end portion integral with the gingival end of said intermediate portion and extending into the gingival end of said occlusal-gingivally extending opening, and means on said clamp preventing substantially relative rotation between said bracket and clamp.

11. In combination with an orthodontic bracket including a body having connected occlusal-gingivally extending mesial, labial and distal walls defining an occlusal-gingivally extending opening, a bypass clamp for restraining an arch wire at the labial side of the labial wall, said clamp comprising an intermediate portion having a lingual face formed to at least partially engage the labial side of the labial wall, said lingual face of said intermediate portion and the labial side of said labial wall formed to define an arch wire receiving opening, said arch wire receiving opening being defined by a mesially-distally extending slot in said labial wall, an occlusal end portion integral with the occlusal end of said intermediate portion and extending into the occlusal end of said occlusal-gingivally extending opening, a gingival end portion integral with the gingival end of said intermediate portion and extending into the gingival end of said occlusal-gingivally extending opening, one of said end portions having a cross section coacting with the cross section of said bracket opening to prevent substantial relative rotation between the bracket and clamp, and means extending from said intermediate portion to engage the arch wire at a point spaced from the bracket.

12. In combination with an orthodontic bracket including a body having connected occlusal-gingivally extending mesial, labial and distal walls defining an occlusal-gingivally extending opening, a bypass clamp for restraining an arch wire at the labial side of the labial wall, said clamp comprising an intermediate portion having a lingual face formed to at least partially engage the labial side of the labial wall, said lingual face of said intermediate portion and the labial side of said labial wall formed to define an arch wire receiving opening, said arch wire receiving opening being defined by a mesially-distally extending slot in said labial wall, an occlusal end portion integral with the occlusal end of said intermediate portion and extending into the occlusal end of said occlusal-gingivally extending opening, a gingival end portion integral with the gingival end of said intermediate portion and extending into the gingival end of said occlusal-gingivally extending opening, one of said end portions having a cross section coacting with the cross section of said bracket opening to prevent substantial relative rotation between the bracket and clamp, and means extending mesially and distally from said intermediate portion to engage the arch wire mesially and distally of said bracket.

References Cited

UNITED STATES PATENTS 1,890,487   12/1932   Angle _____ 32—14

ROBERT PESHOCK, Primary Examiner

UNITED STATES PATENT OFFICE

CERTIFICATE OF CORRECTION

Patent No. 3,497,954                      Dated March 3, 1970

Peter C. Kesling

It is certified that error appears in the above identified patent and that said Letters Patent are hereby corrected as shown below:

In the Specification, Column 5, line 22, after "relative" insert --rotation--; line 69, change "occlusion" to --occlusal--.

In the Claims, Column 6, line 17, insert --end-- before "portions".

SIGNED AND SEALED

AUG 25 1970

(SEAL)
Attest:

Edward M. Fletcher, Jr.
Attesting Officer

WILLIAM E. SCHUYLER, JR.
Commissioner of Patents